Patented Jan. 29, 1952

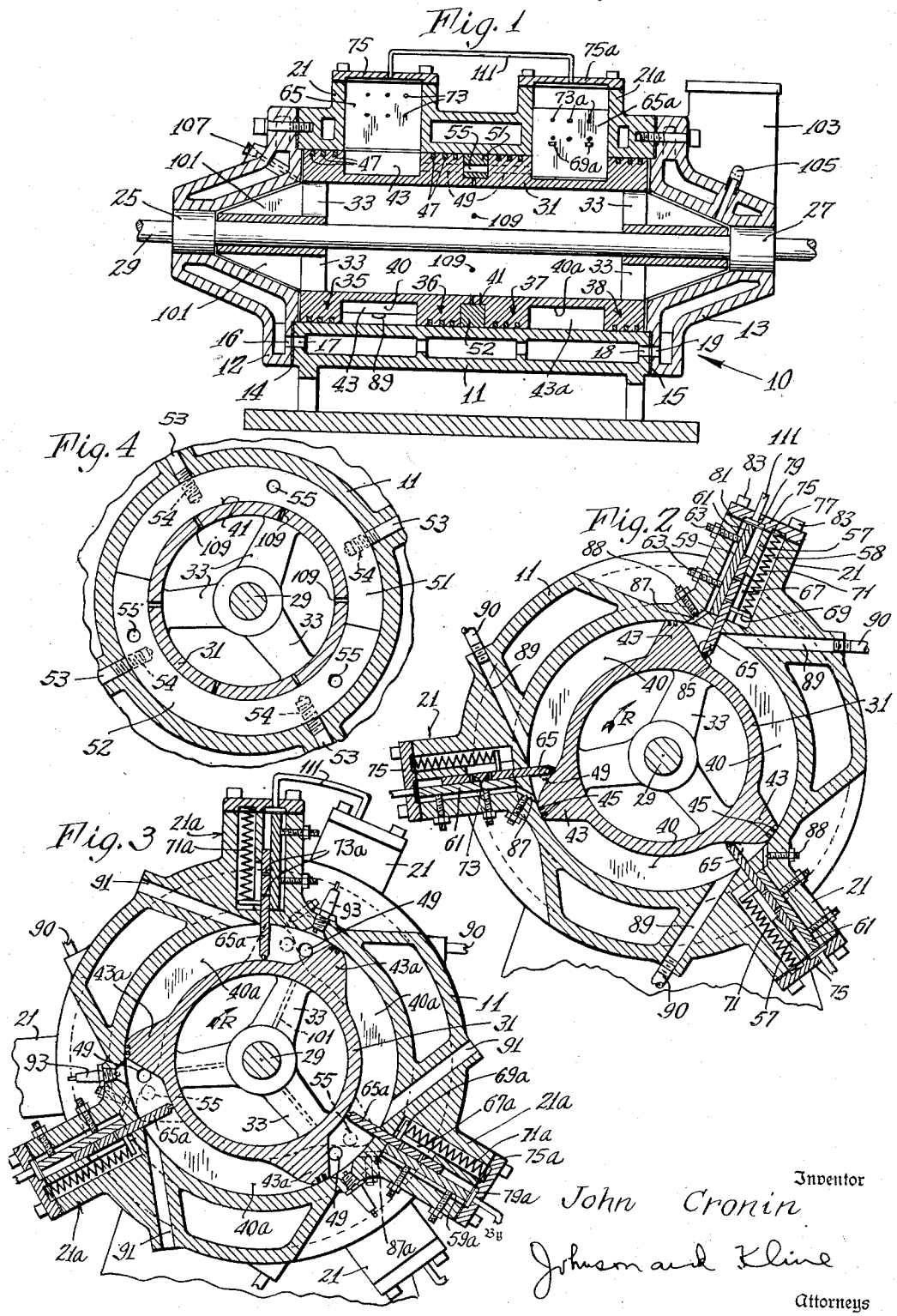

2,583,633

UNITED STATES PATENT OFFICE 2,583,633

SLIDING ABUTMENT TYPE ROTARY
INTERNAL-COMBUSTION ENGINE

John Cronin, Stonington, Conn.

Application September 13, 1949, Serial No. 115,359

6 Claims. (Cl. 123—14)

This invention relates to improvements in internal combustion engines, and more particularly to a rotary engine of the type having a rotor which mounts driven piston surfaces moving within an annular chamber formed between the rotor and stator, and in which a sliding abutment mounted on the stator is extended across the chamber to provide a reaction surface, and is retracted by a cam surface on the piston when the piston passes thereunder. Certain particular aspects of the invention herein described relate to a rotary engine having separate parallel annular chambers, one for fuel charge compression and another for combustion and power.

The field of rotary internal combustion engines although widely investigated, has not received a great deal of attention from the standpoint of practical construction and use, due apparently to the fact that no really economical construction which can compete in cost and convenience with the modern reciprocating engine has as yet been devised. The theoretical advantages of having the majority of heavy moving engine parts rotate with the drive shaft instead of reciprocating and oscillating, are quite apparent, for noise, vibration, and wear can be outstandingly reduced in this fashion. In spite of these advantages, however, the few points of high wear, such as the usual sliding reciprocating abutments, have been the source of much difficulty and in fact, have usually become defective in such a short period of time as to make this type of engine appear quite impractical from the standpoint of durability. In addition, the complexity of the previous engines of this nature have called for a large number of machining operations on the rotor and stator resulting in such a high cost of manufacture that no real competition with standard reciprocating engines was possible. Likewise the problem of cooling the engine has been one difficult of solution, for the devices heretofore known have either relied on a simple air-cooled structure unsatisfactory under conditions of high compression and high power output, or else have provided excessively complicated liquid cooling systems for the rotor.

It is an object of this invention, therefore, to provide a rotary internal combustion engine in which the rotor and stator are so configured that they can be formed with a minimum of machining operations.

It is another object of the invention to provide for adequate liquid cooling of the engine and particularly of the rotor without excessive structural complication.

It is still another object of this invention to provide a rotary internal combustion engine having slidable abutments provided with adequate lubrication, mounted for appropriate wear adjustment, and provided with devices for shockproof operation so as to have a long effective life comparable to the durability of the engine as a whole.

It is a further object of the invention to provide an internal combustion engine which embraces the advantages of the rotary type, but which at the same time is so improved and simplified as to provide reliable operation over long periods at reasonable manufacturing and operating cost, whereby competition with the conventional reciprocating engine becomes feasible.

Additional features and advantages will hereinafter appear.

In the drawing:

Figure 1 is a reduced scale elevation, substantially in axial section, of the engine of this invention.

Fig. 2 is a transverse section through the left hand or compression chamber shown in Fig. 1, and looking towards the left, but with the parts in a position corresponding to that in Fig. 3.

Fig. 3 is a transverse section through the right hand or combustion chamber of Fig. 1, and looking towards the left, the parts being shown in firing position.

Fig. 4 is a fragmentary transverse central section through the device of Fig. 1 showing the valve ring and the means for mounting the same in the stator.

The engine of this invention comprises a stator 10 made up of three castings, a central block casting 11, and two end or head castings 12 and 13 which have ground surfaces bolted to the ground end surfaces of the head casting 11 with sealing gaskets 14 and 15 between the surfaces. All of the castings 11, 12 and 13 are hollow as shown in Fig. 1, and are provided with ports such as 16, 17, 18 and 19 providing communication between their hollow interiors and forming a space around the engine through which any suitable coolant liquid, such as water, may be circulated by the usual circulating pump, and thence through any conventional type of radiator or heat transfer device.

The block casting 11 is formed to provide two peripheral series of radial abutment housings, the three numbered 21 serving the compression chambers and the three numbered 21a serving the power chambers, said chambers to be hereinafter described. It will be apparent from Fig. 3 that the housings of one set are peripherally offset from those of the other set for reasons which will subsequently appear. The block casting 11 furthermore has a smooth cylindrically bored surface which can be readily machined or honed on a lathe or using a boring bar, and thus offers a minimum of manufacturing problems in its construction.

The head castings 12 and 13 are equipped with central bearings 25 and 27 which rotatably support the drive shaft 29 on which is rigidly mounted the hollow rotor 31 by means of radial spokes 33. The external surface of the rotor exhibits four cylindrical rings or lands 35, 36, 37, and 38 between pairs of which are formed three annular recesses. The left-hand recess in Fig. 1 in cooperation with the adjacent cylindrical wall of the block 11 forms an annular space which is divided into three sector shaped chambers 40 by radial bulges or projections 43 which operate in the manner of pistons. The right-hand recess in Fig. 1 in cooperation with the adjacent cylindrical wall of the block 11 forms an annular space which is divided into three sector shaped chambers 40a by radial piston bulges or projections 43a. The chambers 40 are known as compression chambers, and the chambers 40a are known as power chambers for reasons that will hereinafter appear in the description of the operation of the device. Each of the projections 43 and 43a is preferably provided with grooves 45 along the summit thereof for receiving suitable sealing strips to provide substantially gas-tight engagement with the surface of block 11. Likewise each of the lands 35, 36, 37 and 38 is provided with peripheral grooves 47 for the reception of suitable sealing rings similar to those employed on a conventional reciprocating piston, in order to confine the gases against undesired escape from one chamber to another, or from the chambers 40 or 40a to the interior of the stator 10 at the ends of the rotor.

As is apparent from Fig. 3, the projections 43 and 43a are offset by a slight angle peripherally of the rotor, and between each pair of proximate projections 43 and 43a is formed a pair of coaxial valve ports 49, 49, one through each of the lands 36 and 37 (see Figs. 1 and 3) with their common axis substantially parallel to the axis of the rotor. These openings, being made in the lands, move in coincidence with the rotor and the piston projections 43 and 43a.

Mounted between the lands 36 and 37 and snugly filling the annular recess 41 therebetween is a split valve ring consisting of a pair of semicircular parts 51 and 52 rigidly attached to the block 11 by means of bolts 53 (Fig. 4). The parts 51 and 52 are constructed in this fashion so as to provide for the manufacture of block 11 by a cylindrical boring process as described above. By virtue of this arrangement the half rings 51 and 52 may be placed in the groove 41 prior to positioning of the rotor in the stator 10, and may be slid into axial position simultaneously with the rotor. The latter can then be rotatably adjusted to bring the threaded openings 54 in the half rings 51 and 52 into registry with the ends of bolts 53, by which the valve ring will then be firmly clamped to the stator and remain in fixed position thereon with the rotor 31 rotating within said valve ring. The valve ring 51, 52 is provided with three equally spaced ports 55 which are arranged to connect the coaxial ports 49, and thereby chambers 40 each with one of the chambers 40a during a small part of each "stroke" or each one-third revolution, as will hereinafter appear.

The housings 21 and 21a are shown as extending radially beyond the outer surface of the block 11, mainly in order to make them large enough so that the details of interior parts will be more clearly visible in the drawing. It will of course be understood that, if desired, the engine may be designed with larger coolant passages in the block 11, or by other changes in proportion, so as to bring the outer ends of housings 21 flush with the outer surface of block 11 as an aid to casting the same.

The housings 21 and 21a, except for being reversed as to the direction from which they are approached by the rotor, are substantially identical as well as the parts carried thereby. For this reason a single housing 21 will be described, it being understood that the housings 21a have similar parts designated by the corresponding reference numerals having the postscript a.

Each housing 21 is divided by an axially extending wall 57 into two spaces 58 and 59. In the space 59 is placed a plate 61 which is parallel to wall 57 and adjustable towards and away from said wall by means of a plurality of screws 63 threaded through the adjacent wall of housing 21. Mounted for radial sliding movement between the walls 57 and 61 is an abutment member 65 in the form of a plate. A plurality of radially extending slots 67 in wall 57 are provided, and through some of these extend abutment-operating pins 69 which are connected at one end to the abutment 65 and are lightly urged to a radially inward position by springs 71 which press against the housing caps to be hereinafter described. The abutment plate 65 preferably has sufficient radial extent to close slots 67 in all of its operating radial positions.

The space 58 is preferably maintained full of oil by means of any conventional oil filler fitting (not shown) and thus provides lubrication for one surface of the sliding abutment 65. Oil holes 73 are drilled in the abutment 65, preferably opposite slots 67, and meter the oil from space 58 to lubricate that surface of abutment 65 which slides against plate 61. The adjusting screws 63 may be used to provide an accurate sliding fit of plate 61 against the abutment 65, and to compensate for any wear which may occur to the parts in use. The outer end of housing 21 is closed by a cap 75 having recesses 77 and 79 on its inner surface and which is attached to the housing and forced against an intervening gasket 81 by screws 83. The recess 77 includes means for receiving and positioning the ends of springs 71, while the recess 79 straddles the edge of the plate 61 and provides free communication between the portions of space 59 on either side thereof.

The abutment 65 is designed to fit the chambers 40 and is provided with suitable grooves and sealing strips 85 for substantially gas-tight engagement with the walls thereof, said abutment normally being urged radially inwardly at least in part by the springs 71 so as to be at all times in contact with the surface of the rotor 31.

Each housing 21 also has a small access orifice 87 which serves somewhat in the nature of a choke and admits compressed gas, the pressure of which is developed by an advancing piston 43, to enter the housing 21 and impinge against the top edge of abutment 65. The speed of pressure rise and decay, and consequently the average pressure in the housing 21, can be adjusted by means of the valve screw 88 which controls the size of the orifice 87. The organization in the housings 21a which serve the explosion chambers 40a are in all respects similar, except that the pressure which impinges on the upper edge of the abutment 65a is that resulting from the expansion of ignited fuel rather than that generated by a moving piston.

In the sectional views of Figs. 2 and 3, the rotor is travelling in a clockwise direction as indicated by arrows R, so that a relative clockwise position on the stator is one following the datum and counterclockwise position is one in advance of the datum. In Fig. 2 showing the compression chambers, ports 89 are formed through the block casting 11, each immediately following one of the abutments 65, while the previously mentioned orifices 87 are placed so as to precede the said abutments. Ports 89 are fuel intake ports and are for the purpose of leading an explosive mixture of fuel and air into the chambers 40 from any suitable carburation device (not shown) by way of feed lines 99.

Referring now to Fig. 3, which shows the power or explosion chambers in section, ports 91 are formed through the block casting 11, each immediately preceding an abutment 65a, while the corresponding orifice 87a for admission of pressure to the housing 21a, directly follows the abutment, the orifice being shown in dotted lines since it lies in a plane other than that where the section is taken. The ports 91 are for exhaust gases and are preferably connected by conduits to any suitable means (not shown) for muffling the sound of the explosions and conducting the fumes to a suitable disposal point. Also following each abutment by a small angle is an opening in the casting 11 which receives an ignition device or spark plug 93; all of the spark plugs are connected to means (not shown) for supplying electrical energy thereto at properly timed intervals in a well-known manner.

Each end of the rotor 11 mounts a plurality of triangular vanes 101 which are shaped to fit closely the conical interior surface of the head castings 12 and 13. A reservoir 103 is mounted at any suitable location on the framework of the engine and is provided with a conduit 105 which passes through the head casting 13 and opens upon the interior surface thereof. The reservoir 103 is filled with a lubricant fluid such as oil so that the level therein as above the top of the engine, or alternatively, light air pressure may be supplied to the reservoir from a suitable source, maintaining a constant head of oil pressure on the interior of the rotor. A suitable bleed opening 107 for the removal of entrapped air is provided in the casting 12 at the top thereof. In this fashion the interior of the rotor is kept filled with lubricating oil which provides lubrication for drive shaft bearings 25 and 27, and for the end surfaces of the rotor. A plurality of radial oil holes 109 are drilled around the rotor opening into the groove 41 for lubricating the relatively moving surfaces on the rotor 11 and fixed valve ring 51, 52.

Besides operating as a lubricant, the oil inside the rotor also has a coolant function for, as can be seen in Fig. 1, a body of oil is caused to rotate substantially with the rotor due to the presence of vanes 101. Since the oil is at different temperatures, that near the rotor surfaces being warmest and less dense and that farthest from the rotor surface coolest and more dense, a separating action takes place due to the difference in centrifugal pull on the oils of different densities. The radially outward throw of the heavier cool oil against the conical heads 12 and 13, causes the same to be further cooled by its contact with the water jacket surfaces thereof, and to pass axially inwardly by the camming action of the conical shape, whence it passes across the hot surface of the rotor and becomes heated, meets a current from the opposite end of the engine, turns radially inwardly and passes axially out to the end of the engine and into the cooling zone again. These cooling currents are relatively slow but are sufficient to keep the rotor at the desired operating temperature, especially since much of the rotor surface is also exposed quite intimately over large areas to the cooling effect of the water jacket in the stator castings 11, 12 and 13.

Having described the structure of the engine of this invention, the operation thereof will now be explained in detail. The engine hereinbefore described is of the type in which a piston projection 43a is driven around by the expansion of ignited gases exploding between it and a rotationally fixed abutment 65a which can retract into its housing to let the piston 43a pass thereunder when necessary. The engine is also of the type in which the explosive fuel-air mixture is supplied under pressure to the explosion space by an entirely separate coaxial compression machine which operates simultaneously with the explosion engine and is driven by power generated thereby. Fig. 2 illustrates the compression end of the engine at the point when the engine is about to fire, and Fig. 3, the power or explosion end of the engine at the same rotational position. As the compression piston projections 43 are driven around by the power of the engine they pass under the abutments 65 which drop behind them, and they then immediately start to draw in behind themselves fresh charges of fuel through ports 89, simultaneously compressing ahead of them the charge drawn in by the previous piston 43 as it traversed the same path. The fuel charge is thus compressed the amount required, at which time the power pistons 43a have just completed passing under the abutments 65a and the aligned moving ports 49 are advancing upon the fixed valve ports 55. When the ports 49 and 55 start to overlap, the compression space formed ahead of piston 43 is placed in communication with the small charge-receiving space behind the piston 43a for a peripheral length equal to the peripheral length of opening 55 plus twice the peripheral length of openings 49, during which time the fuel charge is transferred from the compression end of the engine to the power end at substantially constant pressure, the one space increasing in volume at the same time the other diminishes. When the aligned moving ports 49 have proceeded far enough to be out of alignment with the fixed valve ports 55, the position of the parts will be that shown in Fig. 3 and the engine is ready for firing. At this instant suitable timing mechanism completes the circuit to the spark plugs 93 igniting the charges behind the pistons 43a whereby the expanding gases drive the pistons 43a around in a clockwise direction. The pistons 43a are simultaneously pushing ahead of them exhaust gases from the previous explosion which occurred when the previous piston 43a was in the same position, and forcing such gases out through the exhaust ports 91. When a "stroke," or one-third revolution, has been completed the cam surface on the leading edge of the piston projection 43a raises the next abutment 65a and the cycle is repeated.

The section in Fig. 1 is taken on a staggered line which brings various parts of the device into the picture plane for the sake of a convenient showing. For example, the left-hand end of the machine is a section which includes a radial line through the center of the uppermost housing 21 in Fig. 2, the central portion of the machine is a section which includes a radial line through the uppermost valve port 55 in Fig. 4, and the right-hand portion of the machine is a section which includes a vertical radial line through the uppermost housing 21a in Fig. 3. The position of the parts shown in Fig. 1 is that occurring when the uppermost compression piston 43 is directly under its abutment 65 and the uppermost power piston 43a has proceeded approximately one-third of the length of its power stroke past firing position.

While three pistons have been shown at each end of the machine, it will be understood that any suitable number may be provided. Preferably, however, three or more simultaneously firing power pistons and a corresponding number of simultaneously compressing compression pistons will be used in order to distribute the explosion and compression forces evenly about the axis of the machine and minimize the side loads and shocks on the equipment.

It will be appreciated that the relative diameters of the parts and valve openings may be suitably adjusted to provide for any compression ratio appropriate to the fuel to be used, and that if more continuity of operation is desired, a plurality of such engines may be coaxially arranged on a single shaft with a rotational offset to stagger the firing times.

One of the important features of the invention is the gas pressure operation of the abutments 65 and 65a. Springs 71 and 71a are preferably rather light and just sufficient to maintain contact of the abutments with the rotor under starting conditions. Primary reliance for urging of the abutments towards the rotor surface is placed on the gas pressure ahead of the compression piston 43 and behind the power piston 43a. These pressures are metered through the orifices 87 and 87a, and are permitted to pass over the tops of adjusting plates 61 and 61a by virtue of the presence of cap recesses 79 and 79a, whereupon they impinge upon the top edges of the abutments 65 and 65a and urge them radially towards sealing position against the rotor 11 with the greatest force at that time when the pressure endeavoring to cause leakage by the abutment is the greatest. Furthermore the gas trapped within the space 59 or 59a of housing 21 or 21a is subject to a sharp compression in response to the outward movement of the abutment when a piston 43 or 43a is passing thereunder. This forms a very effective pneumatic arresting cushion which greatly reduces the degrading effects of shock so noticeable in prior devices employing radially slidable abutments of this nature. While highly satisfactory operation can be obtained with the equipment as described thus far, it is found that rather high instantaneous peak pressures and rather low trough pressures are sometimes existent in the abutment housings 21 and 21a. Since these are normally out of phase in the two sets of housings, in the preferred construction there is provided an equalizing jumper 111 of heavy walled, small diameter tubing which connects the recess 79 of each housing 21 with the recess 79a on the proximate housing 21a. This serves to cut off the sharp peaks and valleys in the pressure curve and provide still smoother operation of the abutments.

Variations and modifications may be made within the scope of the claims and portions of the improvements may be used without others.

I claim:

1. A rotary internal combustion engine comprising a stator and a rotor rotatably mounted therein; a piston on said rotor moving in a rotary path; a housing having a guide wall and mounted on said stator in register with said path; an abutment member mounted in said housing for radial sliding movement towards and away from said rotor and having a high pressure side and a low pressure side; a guide plate mounted in said housing and adjustable towards and away from said guide wall, slidably receiving said abutment between itself and said guide wall to adjust the sliding fit thereof, said guide wall being located at the high pressure side of said abutment and, except at its radially outward end, engaging the housing at its edges and essentially dividing said housing into an abutment compartment and a conduit compartment; and conduit means between the piston path on the high pressure side of said abutment and said conduit compartment, whereby the gas pressure developed in said piston path is transmitted through said conduit compartment, around the outer edge of said guide plate and against the radially outward surface of said abutment to urge the same radially inwardly towards said rotor.

2. A rotary internal combustion engine comprising a stator and a rotor rotatably mounted therein; a power piston on said rotor moving in a first rotary path; a compression piston on said rotor moving in a second rotary path axially spaced from said first path; a pair of housings mounted on said stator, one in register with each of said paths; a wall in each of said housings having a radially extending slot and axially dividing the housing into two compartments; an abutment member mounted in one compartment of each housing for radial sliding movement of one surface thereof against said wall, toward and away from said rotor, the compression abutment having a high pressure side in the direction of an advancing piston and a low pressure side in the direction of a retreating piston, the power abutment having high and low pressure sides in reversed directions; a movable plate adjustably mounted in said one compartment of each housing for slidably engaging the other surface of the corresponding abutment; a projection on each abutment extending through said radial slot in the corresponding wall and into the other compartment of the corresponding housing, and resilient means mounted in said other compartments and urging said projections in a radially inward direction; conduit means connecting the piston path on the high pressure side of each abutment with said one compartment in each housing; and an equalizing conduit connecting said one compartment of the power housing with the corresponding compartment of the compression housing.

3. A rotary internal combustion engine combustion engine comprising a stator and a rotor rotatably mounted therein; a piston on said rotor moving in a rotary path; a housing mounted on said stator in register with said path; a wall having a radial slot and axially dividing said housing into two compartments; an abutment member mounted in one compartment of said housing for radial sliding of one surface thereof against said wall, towards and away from said rotor, said abutment having a high pressure side and a low pressure side; a movable plate adjustably mounted in said one compartment for slidably engaging the other surface of said abutment; a projection on said abutment extending through said radial slot into the other of said compartments and resilient means mounted in said other compartment and urging said projection in a radially inward direction; and conduit means connecting the piston path on the high pressure side of said abutment with said one compartment of said housing.

4. A rotary internal combustion engine comprising a stator and a rotor rotatably mounted therein; a piston on said rotor moving in a rotary path; a housing mounted on said stator in register with said path; a wall having a radial slot and axially dividing said housing into two compartments; an abutment member mounted in one compartment of said housing for radial sliding of one surface thereof against said wall, towards and away from said rotor; a movable plate adjustably mounted in said one compartment for slidably engaging the other surface of said abutment, said abutment being sufficient in extent to close said radial slot in all of its radial positions, the other of said compartments also being sufficiently fluid-tight to serve as a lubricant reservoir; and lubricant openings formed in said abutment in register with the radial slot in said wall.

5. In a rotary internal combustion engine having a compression end and a power end, a hollow rotor having a peripherally arranged compression recess, and an axially spaced, coaxial, peripherally arranged power recess separated from said compression recess by a radially projecting ring, said ring having a port therein designed to connect said recesses; a stator block rotatably mounting said rotor and having a cylindrical bore snugly receiving the same and cooperating with said recesses to form compression and power chambers respectively; valve means removably mounted on said block and extending radially in said bore in a position to open and close said port periodically as said rotor rotates; means closing the ends of said bore in said stator block; means for introducing a fluid lubricant to the interior of said stator block and said rotor, said rotor having end sealing means engaging said bore and preventing access of said lubricant to said recesses; and conduit means formed in said rotor for conducting lubricant from the interior of the rotor to said valve means.

6. In a rotary internal combustion engine, a hollow, open-ended rotor having peripherally arranged recesses and cylindrical sealing lands at its ends; a stator rotatably mounting said rotor and having a cylindrical bore snugly receiving said lands and cooperating with said recesses and lands to form gas-receiving chambers sealed from the remainder of said stator bore, said stator also comprising closure means for the ends of said bore, the interior surfaces of said end closure means having an axially outward taper; means for introducing a fluid lubricant to the interior of said stator at a location having communication with the interior of said hollow rotor; and substantially radial vanes mounted on said rotor adjacent the tapered surfaces of said end closure means, said end closure means having passages therein for conducting a coolant fluid into heat-exchange relationship with the lubricant which is in contact with said tapered interior surfaces.

JOHN CRONIN.

REFERENCES CITED

The following references are of record in the file of this patent:

UNITED STATES PATENTS

| Number | Name | Date |
|---|---|---|
| 992,096 | Wright et al. | May 11, 1911 |
| 1,184,114 | Matthews | May 23, 1916 |
| 1,327,575 | Theemling | Jan. 6, 1920 |
| 1,332,807 | Corliss | Mar. 2, 1920 |
| 1,348,103 | George | July 27, 1920 |
| 1,427,053 | Bidwell | Aug. 22, 1922 |
| 1,949,225 | Van Lammern | Feb. 27, 1934 |
| 1,952,149 | Thomas | Mar. 27, 1934 |

FOREIGN PATENTS

| Number | Country | Date |
|---|---|---|
| 320,791 | France | Nov. 6, 1902 |

(Addition to No. 1,065)